US012665417B2

(12) United States Patent　　　　(10) Patent No.:　　US 12,665,417 B2
Müller　　　　　　　　　　　　　　　(45) Date of Patent:　　　Jun. 23, 2026

(54) DEVICE AND METHOD FOR THE VOLTAGE EQUALIZATION OF A PLURALITY OF TWO-TERMINAL NETWORKS, AND DC POWER DISTRIBUTION SYSTEM

(71) Applicant: SMA Solar Technology AG, Niestetal (DE)

(72) Inventor: Burkard Müller, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 2 days.

(21) Appl. No.: 19/011,792

(22) Filed: Jan. 7, 2025

(65) Prior Publication Data

US 2026/0135377 A1　　May 14, 2026

Related U.S. Application Data

(63) Continuation of application No. PCT/EP2023/069223, filed on Jul. 11, 2023.

(30) Foreign Application Priority Data

Jul. 15, 2022　(DE) .................... 10 2022 117 791.2

(51) Int. Cl.
　　*H02J 1/082*　　　(2026.01)
　　*H02J 1/08*　　　　(2026.01)
　　*H02M 3/156*　　　(2006.01)
(52) U.S. Cl.
　　CPC .............. *H02J 1/082* (2020.01); *H02J 1/084* (2020.01); *H02M 3/156* (2013.01)
(58) Field of Classification Search
　　CPC ........ H02J 1/082; H02J 1/084; H02J 2105/53; H02J 2105/00; H02J 7/04; H02J 7/52; H02M 3/156
　　See application file for complete search history.

(56) References Cited

U.S. PATENT DOCUMENTS

2014/0009106 A1* 1/2014 Andrea ................... H02H 9/002
　　　　　　　　　　　　　　　　　　　　　　320/126
2014/0300185 A1* 10/2014 Buchstaller ............... H02J 3/32
　　　　　　　　　　　　　　　　　　　　　　307/18
(Continued)

FOREIGN PATENT DOCUMENTS

DE　　102011083741 A1　4/2013
DE　　102011088457 A1　6/2013
(Continued)

OTHER PUBLICATIONS

International Search Report dated Oct. 16, 2023, for International Application No. PCT/EP2023/069223.

*Primary Examiner* — Lincoln D Donovan
*Assistant Examiner* — Alex W Lam
(74) *Attorney, Agent, or Firm* — Eschweiler & Potashnik, LLC

(57)　　　　　　ABSTRACT

The disclosure is directed to a device for voltage equalization of a plurality of two-terminal networks. The device includes a current-limiting component, and connection pairs, each having a first connection and a second connection for connecting the two-terminal networks. Two or more of the first connections are each connected to an input. In addition, two or more of the first connections are each connected to an output via a second switch. The second connections are connected or switchably connected to a common reference potential. The device sets switching states of switches by means of a control unit and/or by means of voltages applied to the first connections in such a manner that the current-limiting component intakes power in its input and not in its output, and the current-limiting component outputs power from its output and not from its input.

22 Claims, 9 Drawing Sheets

(56)                     References Cited

U.S. PATENT DOCUMENTS

2017/0365998  A1*  12/2017  Luscan  ................  H01H 33/596
2022/0231513  A1*   7/2022  Falk  ........................  H02J 1/102
2023/0045707  A1     2/2023  Unru et al.

FOREIGN PATENT DOCUMENTS

DE        102019127198  A1      4/2021
DE        102020112880  A1     11/2021
WO          2021084691  A1      5/2021

* cited by examiner

DEVICE AND METHOD FOR THE VOLTAGE EQUALIZATION OF A PLURALITY OF TWO-TERMINAL NETWORKS, AND DC POWER DISTRIBUTION SYSTEM

REFERENCE TO RELATED APPLICATIONS

This Application is a Continuation of International Application number PCT/EP2023/069223, filed on Jul. 11, 2023, which claims the benefit of German Application number 10 2022 117 791.2, filed on Jul. 15, 2022. The contents of the above-referenced Patent Applications are hereby incorporated by reference in their entirety.

FIELD

The disclosure relates to a device and a method for the voltage equalization of a plurality of two-terminal networks.

BACKGROUND

Many electrical and electronic devices include a capacitance effective at their connections and/or exhibit capacitive behavior at their connections. Such devices must be pre-charged with a limited current before they can start their normal operation, for example, when connecting the connections to a voltage source. For example, inverters with an uncharged high-capacitance direct current intermediate circuit (DC intermediate circuit) cannot easily be connected to a battery on the DC side. This is because, in this case, the battery would feed into the initially uncharged DC intermediate circuit and, at least for a short time, generate a high in-rush current, which could damage components of the inverter, e.g., semiconductor switches and/or intermediate circuit capacitors. This similarly applies to devices that have a high capacitance effective at their connection and that are connected to the DC side of the inverter. Here, the charged capacitance of the devices can behave as a voltage source, at least for a short time, and generate a high in-rush current into the DC intermediate circuit of the inverter. A similar problem would also arise in the opposite direction, namely if a DC side of an inverter comprising a charged DC intermediate circuit is connected to a connection of an electrical device having an uncharged effective capacitance at its connection. Devices with a correspondingly high capacitance could include electrolyzers or DC buses of direct current grids (DC grid), for which it is sometimes not even known which capacitances are connected. Even if the inverter is connected to an AC voltage source, for example, an AC grid, on the AC side, high in-rush currents into the initially uncharged DC intermediate circuit can be generated via freewheeling diodes in a bridge circuit of the inverter and can damage the freewheeling diodes or other components of the inverter that are located in the path of the inrush current.

In order to avoid such damages, it is known to pre-charge devices with an initially uncharged capacitance via a pre-charging resistor or via an actively controlled, current-limiting component, for example, a DC/DC converter, before they are connected with low resistance to a voltage source. In this way, a controlled equalization of the voltages of the device on the one hand and of the voltage source on the other hand can take place, and a high in-rush current is suppressed.

In the case of complex electrical DC power distribution systems, a plurality of devices, each with a large capacitance, often have to be connected and thus pre-charged simultaneously or also one after the other. In order to use the devices as flexibly as possible, it may also be desirable to provide different pre-charging paths for a device. Specifically, it may, for example, be desirable to be able to pre-charge a DC intermediate circuit of an inverter via the DC side at one time and via the AC side of the inverter at another time. In order to meet all of these requirements, one or more separate pre-charging resistors can be provided for each of the devices, which would however result in significantly high costs overall. Furthermore, it is possible that individual devices, for example, in the case of a multi-stage voltage equalization, operate in a power-consuming manner at one time and in a power-outputting manner at another time. In this case, an actively controlled, current-limiting component would have to be designed for bidirectional power flow, which also entails increased costs relative to a current-limiting component that only operates unidirectionally.

Publication EP 2760096 A1 discloses an electrical storage system that operates with only a small number of current-limiting resistors. The storage system includes a charger, which supplies power from an external current source to an electrical storage device and power from the electrical storage device to an external device. A first main relay and a second main relay make it possible to connect a positive electrode connection and a negative electrode connection of the electrical storage device to a load. A third main relay is connected in series with a current-limiting resistor and, together with the current-limiting resistor, is connected in parallel with the first main relay. A first charging relay and a second charging relay make it possible to connect the positive and negative electrode connections of the electrical storage device to the charger. A third charging relay is connected in series with the current-limiting resistor and, together with the current-limiting resistor, is connected in parallel with the first charging relay. In this case, it is necessary for power to flow through the current-limiting resistor in two opposite directions, i.e., bidirectionally. Replacing the current-limiting resistor with a current-limiting component that operates only unidirectionally is not possible here.

Publication DE 10 2011 083741 A1 discloses a circuit arrangement for variably interconnecting power sources and power consumers, comprising a bidirectional AC/DC converter, a DC/DC converter, at least four electrical switches, and a control device for controlling the switches and the converters.

Publication DE 10 2011 088457 A1 discloses a circuit arrangement for converting an input voltage into an output voltage, with an input voltage terminal pair for connecting a voltage source, an output voltage terminal pair for tapping an output voltage, and a half-bridge with two controllable switching elements and a choke which is connected to a half-bridge tap arranged between the controllable switching elements. The half-bridge can be connected by means of a switch arrangement to at least either the first input voltage terminal or the first output voltage terminal, wherein the choke is or can be connected to the input or the output.

Publication US 2014/0009106 A1 discloses a battery and load balancing circuit for preventing an in-rush current when initially connecting batteries and/or loads in parallel. Various techniques are used, such as charging and discharging using direct current converters, to balance charges between batteries and between batteries and capacitive loads.

SUMMARY

The disclosure is directed to a device and a method for the voltage equalization of a plurality of two-terminal networks, for example, for pre-charging and/or discharging one or more of the two-terminal networks. The aim in one embodiment is to implement the method and the device at the lowest possible cost. In one embodiment, the device and the method are to be suitable for bringing about a voltage equalization of a plurality of two-terminal networks with the smallest possible number of current-limiting components. The aim in one embodiment is also to make it possible to design the current-limiting components as simply and cost-effectively as possible, for example, in a case where the current-limiting component is actively controlled. The disclosure is also directed to a DC power distribution system suitable for carrying out the method.

The device according to the disclosure is configured to carry out a voltage equalization of a plurality n of at least two (n≥2) two-terminal networks (P1, P2, P3). At least one, possibly also a plurality, of the two-terminal networks can have an effective capacitance on the connection side or exhibit effective capacitive behavior on the connection side. The device comprises:

a current-limiting component with an input and an output, and n connection pairs, each having a first connection and a second connection for connecting the n two-terminal networks.

Two or more of the first connections are each connected to the input of the current-limiting component via a first switch or directly. As a result, these two or more of the n connection pairs are configured to be connected to a two-terminal network that operates at least temporarily in a power-outputting manner. Furthermore, two or more of the first connections are each connected to the output of the current-limiting component via a second switch, whereby these two or more of the n connection pairs are each configured to be connected to a two-terminal network operating at least temporarily in a power-consuming manner. The second connections of the n connection pairs are directly or switchably connected to one another and to a common reference potential GND. The device is configured to set switching states of the first switches and of the second switches by means of a control unit and/or by means of voltages applied to the first connections relative to the reference potential, and thus also relative to the second connections, in such a way that the current-limiting component intakes power from one or more of the first connections via one or more of the first switches or the direct connection to the input of the current-limiting component, but not via one or more of the second switches.

In one embodiment the current-limiting component outputs power to one or more of the first connections via one or more of the second switches, but not via one or more of the first switches. Furthermore, in one embodiment the switching states of the first and second switches allow power to flow unidirectionally via the current-limiting component, namely from the input of the current-limiting component to its output, whereas a power flow directed from the output to the input, and thus a bidirectional power flow via the current-limiting component, is suppressed. Switching states that are not suitable for this suppression can be avoided in one embodiment by appropriately controlling the first switches and the second switches or can be excluded from the outset by using a unidirectional switch as the first switch and/or as the second switch. By means of the device, it is thus possible to allow power to flow from one or more of the first connections that are each assigned to a power-output-ting two-terminal network, along a path via the current-limiting component to one or more of the first connections that are each assigned to a power-consuming two-terminal network. If necessary, however, a power flow between two or more of the first connections can be suppressed at least temporarily by means of the switching states of the first and the second switches by bypassing the current-limiting component. For this purpose, it is also possible to configure the switches as unidirectional switches.

In this description, power consumption or power output at individual contacts is to be understood as relative the reference potential GND. This means that the power consumption in a contact is the current into the contact multiplied by the voltage between the contact and the reference potential GND. Accordingly, the power output from a contact is the current out of the contact multiplied by the voltage between the contact and the reference potential GND. A power flow through a component means that the component absorbs power at one contact and outputs power at another contact. Within the meaning of this description, a contact can, for example, be understood here as the first connection or the second connection of a two-terminal network. In addition, the term "contact" can also refer to the input or the output of the current-limiting component. Finally, the contact can also be a contact of one of the switches of the first and the second switch.

A method according to the disclosure makes possible a voltage equalization of a plurality n of at least two (n>2) two-terminal networks, of which at least one includes an effective capacitance on the connection side or exhibits effective capacitive behavior on the connection side. The method can be carried out with the device according to the disclosure and comprises the following:

connecting each of the n two-terminal networks to one of the connection pairs of the device, provided that they are not already connected, so that two or more of the n two-terminal networks are each connected to the input of the current-limiting component in a single-terminal manner directly or switchably via a first switch, and two or more of the n two-terminal networks are each connected to the output of the current-limiting component in a single-terminal manner switchably via a second switch, bringing about the voltage equalization by setting switching states of the first switches and of the second switches via the control unit and/or by voltages applied to the first connections in such a way:

that the current-limiting component intakes power from one or more of the first connections via one or more of the first switches or the direct connection to the input of the current-limiting component, but not via one or more of the second switches, and that the current-limiting component outputs power to one or more of the first connections via one or more of the second switches, but not via one or more of the first switches, so that a unidirectional power flow via the current-limiting component from the input to the output is made possible, and a reverse power flow from the output to the input, and thus also a bidirectional power flow via the current-limiting component, is prevented.

In the method, by means of the switching states of the first and second switches, a power intake of the current-limiting component is thus shifted to its input and not to its output, while a power output of the current-limiting component always takes place at its output and not at its input. This results in a unidirectional power flow directed from the input to the output of the current-limiting component, which power flow starts from one or more of the n two-terminal networks operating in a power-outputting manner and runs along a path via the same current-limiting component to one or more of the n two-terminal networks operating in a power-consuming manner. If desired, a power flow between two or more of the n two-terminal networks can be suppressed, or at least temporarily suppressed, by bypassing the current-limiting component.

A voltage equalization between a plurality of two-terminal networks can be carried out with the method according to the disclosure. Alternatively, it is possible in one embodiment that the method can be combined with other known methods for voltage equalization. For example, in addition to the path that leads via the current-limiting component, two of the first connections may also be connected or switchably connected via a further path that does not lead via the current-limiting component. Specifically, for example, the first connections of two two-terminal networks can be connected or switchably connected via a further impedance, for example a further pre-charging resistor. This is advantageous in one embodiment if the voltage equalization of the relevant two two-terminal networks requires a large power flow that exceeds the current carrying capacity of the current-limiting component.

A two-terminal network within the meaning of the disclosure may include two terminals. Alternatively, it is however also possible for the two-terminal network to have more than two, for example, four or more, terminals. In this case, individual terminals can be considered in pairs as a two-terminal network. For example, a DC side of an AC/DC converter can be a two-terminal network within the meaning of the disclosure. The same applies to an input side and an output side of a DC/DC converter. A two-terminal network operating in a power-outputting manner may, but does not necessarily have to, operate in a power-outputting manner at all times. Rather, it is possible that a two-terminal network or individual two-terminal networks can operate both in a power-outputting and in a power-consuming manner during the voltage equalization, provided that this occurs at different times. For example, such a two-terminal network can operate in a power-outputting manner at one time and in a power-consuming manner at another time. Such behavior can, for example, occur during a multi-stage voltage equalization. The same applies analogously to a power-consuming two-terminal network. As part of the voltage equalization, a power-consuming two-terminal network can also operate in a power-outputting manner at one time and in a power-consuming manner at another time.

A voltage equalization within the scope of the disclosure can, for example, comprise a pre-charging of a previously uncharged or partially charged two-terminal network or of a plurality of previously uncharged or partially charged two-terminal networks connected to the device. The two-terminal networks that are pre-charged during the voltage equalization can each operate in a power-consuming manner. Alternatively, the voltage equalization may also comprise a complete or partial discharge of one or more previously charged two-terminal networks connected to the device. The two-terminal networks that are to be discharged during the voltage equalization can each operate in a power-outputting manner.

During the voltage equalization, the voltage(s) of one or more of the two-terminal networks involved in the power flow may change over time. This is, for example, the case for the two-terminal networks that include a capacitance effective on the connection side, i.e., between their two terminals, or that exhibit capacitive behavior at their terminals. Specifically, a voltage applied between the terminals of a power-outputting two-terminal network may decrease over time. In a similar way, a voltage applied between the terminals of a power-consuming two-terminal network may increase overtime. In addition to two-terminal networks that change their voltages over time, there may also be two-terminal networks that have a time-invariant voltage. This is the case, for example, in two-terminal networks where a power flowing out of the terminals is compensated by a power source that is part of the two-terminal network or that is connected to a third and a fourth terminal of the two-terminal network. In any case, in the time course of the voltage equalization process, a change in the voltages of at least one two-terminal network, possibly also of a plurality of two-terminal networks, occurs in such a way that the voltages of the power-outputting two-terminal networks and the voltages of the power-consuming two-terminal networks are adjusted to equal one another.

The optional suppression of the power flow by bypassing the current-limiting component between two or more first connections, each assigned to a power-outputting two-terminal network, does not have to be permanent. Rather, in one embodiment it may be sufficient if it takes place in the time course of the voltage equalization at least until there is sufficient equalization between the voltages of the corresponding first connections so that they differ slightly from one another. The same also applies to the optional suppression of the power flow by bypassing the current-limiting component between the first connections that are each assigned to a power-consuming two-terminal network.

During the voltage equalization using the device according to the disclosure and by the method according to the disclosure, the switching states of the first switches are used to set which of the two-terminal networks in principle intended for power output operates in a power-outputting manner at a certain time. The switching states of the second switches are used to set which of the two-terminal networks in principle intended for power consumption operates in a power-consuming manner at a certain time. It is therefore possible to also use the switching states of the first and second switches to set which of the power-outputting two-terminal networks is connected to which of the power-consuming two-terminal networks at a certain time. In this case, the power always flows from one or more power-outputting two-terminal networks to one or more power-consuming two-terminal networks via the same current-limiting component. In one embodiment, this current-limiting component therefore only needs to be provided once, and not separately for each two-terminal network or even for each pair of two-terminal networks between which voltage equalization is to take place, which means enormous cost savings, for example, as the number of two-terminal networks increases. In addition, a unidirectional power flow via the current-limiting component from its input to its output is specified via the switching states of the first and second switches. Specifically, the first switches are used for a power output by two-terminal networks that are currently operating in a power-outputting manner, to the input of the current-limiting component. Furthermore, the second switch are used for a power consumption by two-terminal networks that are currently operating in a power-consuming manner, from the output of the current-limiting component. It is therefore sufficient to design the current-limiting component itself for a unidirectional power flow. It can therefore also be implemented more cost-effectively than a current-limiting component designed for a bidirectional power flow. This is, for example, the case if the current-limiting component is an actively controllable current-limiting component, for example, a DC/DC converter. If a DC/DC converter configured as a buck converter is desired for the voltage equalization, it is sufficient that the DC/DC converter operate in a step-down manner in one direction, for example, from the input to the output. It does not need to be additionally designed to also operate in a step-down manner from the output to the input since such a directed power flow is suppressed via the switching states of the first and second switches. Furthermore, it is generally sufficient if the DC/DC converter conducts a current in one direction so that, for example, a buck converter can be configured with only one active switch and does not have to be configured as a half-bridge. Overall, the use of the device according to the disclosure and of the method according to the disclosure results in a simple and cost-effective voltage equalization of a plurality of two-terminal networks. Multiple embodiments of the disclosure are specified in the following description and the dependent claims, the features of which can be applied individually and in any desired combination with one another.

In principle, it is possible that the device is designed for the voltage equalization of only two two-terminal networks, i.e., that n=2 applies. In this case, the device has two connection pairs, wherein the first connections of both connection pairs are each connected via a first switch to the input and via a second switch to the output of the current-limiting component. In this embodiment, both two-terminal networks are designed to operate in principle, i.e., at different times, in a power-outputting manner and in a power-consuming manner.

However, in one embodiment, the device is configured for a voltage equalization of three or more (n≥3) two-terminal networks and may have three or more connection pairs for this purpose. At least temporarily, at least three, possibly more, optionally all of the first connections, and the two-terminal networks connected thereto, can be simultaneously involved in the power flow via the current-limiting component. The cost advantage of the method and of the device increases with the number of two-terminal networks involved in the voltage equalization, since each newly added two-terminal network can utilize the already existing current-limiting component.

Even in a case where the device is configured for the voltage equalization of more than just two two-terminal networks (n≥3), one two-terminal network/a plurality of two-terminal networks, for example, in the case of a multi-stage voltage equalization, can operate in a power-outputting manner at one time and in a power-consuming manner at another time. It is therefore also possible in this case that one or more of the first connections are each switchably connected via a first switch to the input of the current-limiting component and also switchably connected via a second switch to the output of the current-limiting component. In this case, one or more bridge branches are formed which are assigned to the respective first connections and which each have a series circuit of the first switch assigned to the relevant first connection and of the second switch assigned to the relevant first connection. Branch taps, which are each arranged within the bridge branches between the first switch and the second switch, connect the first connections to the bridge branches assigned thereto. Thus, each of the corresponding first connections can be conductively connected to the input via a closed first switch when the relevant connected two-terminal network is in power-outputting operation, and can be connected to the output of the current-limiting component via a closed second switch when the relevant connected two-terminal network is in power-consuming operation. In this way, it is ensured that the power flow is unidirectional from the input to the output of the current-limiting component, regardless of whether a particular two-terminal network is currently operating in a power-consuming or power-outputting manner.

In one embodiment of the device, at least one of the first switches and/or at least one of the second switches can each comprise a diode D or can each be formed as a diode D. In this case, a forward conducting and reverse blocking behavior can be imposed on the at least one first switch and/or the at least one second switch via the diode comprised by the switch. In this context, a forward conducting behavior can be understood in the case of a first switch as a conducting behavior that allows power to flow from the two-terminal network assigned to the first switch, while, in the case of a second switch, it refers to a conducting behavior that allows power to flow into the two-terminal network assigned to the second switch. Accordingly, in this context, a reverse blocking behavior can be understood in the case of a first switch as a blocking behavior that blocks power from flowing into the two-terminal network assigned to the first switch, while, in the case of a second switch, it refers to a blocking behavior that blocks power from flowing out of the two-terminal network assigned to the second switch.

This allows undesirable switching states, i.e., switching states that oppose the desired unidirectional power flow through the current-limiting component, to be suppressed via the reverse blocking behavior of the corresponding first switches and/or second switches. The switching states of the corresponding first and/or second switches that in one embodiment each comprise a diode or are each formed as a diode can in this case be set through the voltages applied to the first connections relative to the GND potential, i.e., the respective voltages of the two-terminal networks, and it is not necessary to control the switching states via a control unit. In the case of a large number of first switches that are each formed as a diode, the diode in which the two-terminal network assigned to the diode has a maximum voltage or a minimum voltage in comparison to the other two-terminal networks always assumes a conductive switching state. The same applies to the second switches that are each formed as a diode. A control unit may therefore be omitted entirely, for example, if each of the first switches and the second switches is formed as a diode, or a control unit required for other reasons may be configured more simply since it has to process fewer functions, which has an advantageous effect on the costs incurred for a corresponding device. In addition, a diode is usually more cost-effective than an actively controllable semiconductor switch, which also provides a cost advantage for the corresponding device. It is understood that in one embodiment a plurality, possibly also each, of the first switches in the device may in each case have a diode or be configured as a diode. Alternatively or cumulatively, a plurality of the second switches, and possibly also each of the second switches, may in each case have a diode or be configured as a diode.

In one embodiment, each of the first switches and each of the second switches of the device may be formed as a diode. In this embodiment, the diodes can be configured as ready-made diode bridges, resulting in further space and cost savings. The suppression of temporarily unwanted power flows within the device is in this case possible via third switches.

Alternatively or cumulatively, it is however also possible for at least one, possibly also a plurality, of the first switches and/or at least one, possibly also a plurality, of the second switches to each comprise a switch that can be controlled by the control unit. This can in particular be a semiconductor switch or an electromechanical switch. In such a case, it is understood that the device comprises a control unit for controlling the corresponding first and/or second switch. A switch that can be controlled via the control unit can thus be controlled independently of a voltage that is applied to the first connection assigned thereto, relative to the reference potential GND, which allows a greater degree of freedom when carrying out the method. In this case, a unidirectional power flow through the current-limiting component can be set via the control unit by means of suitable switching states of the first and second switches.

Alternatively or cumulatively to the aforementioned cases, it is also possible to suppress a bidirectional power flow through the current-limiting component in that one, a plurality or each of the first switches and/or one, a plurality or each of the second switches comprises a unidirectional switch. A unidirectional switch within the meaning of the application is a switch with at least one control state designed to allow a power flow in one direction and to suppress it in the opposite direction. Such a unidirectional switch thus exhibits a reverse blocking and forward conducting behavior in the relevant control state, similar to a diode. A distinction must be made between the control state and the switching state of the unidirectional switch. This is because a control state can comprise a plurality of switching states. For example, the aforementioned relevant control state, which is characterized by a forward conducting and reverse blocking behavior, comprises two switching states, namely, the switching state "closed" or "conductive" for a forward power flow and the switching state "open" or "blocking" for a reverse power flow. For assuming the control states, the unidirectional switch can comprise or be constructed from a plurality of different switches. A unidirectional switch may, but does not necessarily have to, be actively controllable and may, for this purpose, have a control connection for assuming the control state. A unidirectional switch that cannot be actively controlled only has a single control state. An actively controllable unidirectional switch, on the other hand, can have further control states that can be advantageously used in the operation of the device. The following examples of a unidirectional switch are mentioned by way of example and not by way of limitation:

a series circuit of an electromechanical switch and a diode, a series circuit of a bidirectionally conductive semiconductor switch and a diode, a parallel circuit of a reverse blocking semiconductor switch and a diode, a reverse blocking semiconductor switch, e.g., a reverse blocking IGBT, a diode, and a thyristor.

Some unidirectional switches and their advantageous properties for the operation of the device are described in more detail in FIGS. 4a-4c.

In one embodiment of the device, at least one of the first switches can now be configured as a unidirectional switch, which, in the relevant control state, behaves like a diode whose flow direction is oriented such that a power flow from the first connection assigned to the first switch, to the input of the current-limiting component is made possible, but a power flow from the input of the current-limiting component to the relevant first connection is suppressed. In this way, in the relevant control state, a power flow via the first switch into the assigned first connection, and thus also a direct power flow from another two-terminal network into the two-terminal network connected to the relevant first connection, is also prevented by bypassing the current-limiting component.

Accordingly, in one embodiment at least one of the second switches in the device can be configured as a unidirectional switch, which, at least in the relevant control state, behaves like a diode whose flow direction is oriented such that a power flow from the output of the current-limiting component to the first connection assigned to the second switch is made possible, but a power flow from the corresponding first connection to the output of the current-limiting component is suppressed. In this way, in the relevant control state, a power flow via the second switch from the first connection assigned thereto, and thus also a direct power flow from the two-terminal network connected to the first connection, into another two-terminal network is also prevented by bypassing the current-limiting component.

In one embodiment, if all first and second switches of the device are configured as unidirectional switches, it can be ensured, at least when all of these switches assume the relevant control state, that power flows neither in an undesirable direction via the current-limiting component nor directly between two two-terminal networks.

Further, in one embodiment control states of a unidirectional first and/or second switch can be used to reduce a forward voltage and thus a power loss of the corresponding unidirectional switch, as, for example, in a self-blocking MOSFET in which the channel can be increased in parallel with a body diode, to establish a direct connection between the first connections of two two-terminal networks after completion of the voltage equalization, and/or to temporarily suppress unwanted power flows through the unidirectional switch by, for example, additionally arranging an electromechanical or semiconductor switch in series with the diode.

In one embodiment, the current-limiting component can comprise, as a component part, an ohmic resistor $R_{VL}$, a thermistor, for example, a negative temperature coefficient (NTC) thermistor or a positive temperature coefficient (PTC) thermistor, and/or a semiconductor switch $T_{VL}$ that can be actively controlled by the control unit. It is also possible that the current-limiting component comprises a series circuit of two different ones of these component parts. In a further embodiment, the current-limiting component can be configured as a DC/DC converter, for example, as a DC/DC converter that steps down from the input to the output. Relative to an ohmic resistor as a current-limiting component, this allows the power flow through the current-limiting component to be controlled more finely, resulting in a greater degree of freedom in carrying out the method for voltage equalization.

In one embodiment, the device may additionally comprise a switching unit configured to switchably connect two or more of the first connections with low resistance to one another, and a control unit configured to control the switching unit. In one embodiment the control unit of the switching unit may be the same control unit that is also used to control the first and second switches. The control unit can be configured to connect two or more of the first connections with low resistance to one another depending on a voltage prevailing between the relevant first connections. Specifically, for example, two first connections, more than two first connections, or all first connections of the n two-terminal networks can be connected with low resistance to one another by means of the switching unit if or when an absolute value of a voltage applied between the relevant first connections reaches or falls below a voltage threshold value $U_{TH}$. For this purpose, it is possible in one embodiment to detect the voltage of each of the first connections separately. Alternatively, it is however also possible for the device to comprise one, for example, only one, voltage sensor for detecting a voltage U applied to the current-limiting component, i.e., a voltage U applied between the input and the output of the current-limiting component. In this case, the control unit is configured to operate the switching unit depending on the voltage U applied to the current-limiting component. In this way, a number of required voltage sensors and thus the cost of the device can be further reduced.

In one embodiment the switching unit for the switchable low-resistance connection of two or more of the first connections of the n two-terminal networks to one another can also be formed via two or more of the first switches controllable by the control unit, or via two or more of the second switches controllable by the control unit. This can be advantageous for cost reasons if actively controllable first and/or second switches are already present and their current carrying capacity is also sufficiently dimensioned. Alternatively, it is also possible in one embodiment to provide additional separate switches for the switching unit. The switching unit can be configured such that it comprises a plurality of switches so that each first connection can be connected separately with low resistance to each of the other first connections.

In a further embodiment, the device can have one or more third switches that can be controlled by the control unit, wherein each of the third switches is arranged between a different one of the first connections and the first switch assigned thereto, and/or between a different one of the first connections and the second switch assigned thereto. In this way, individual two-terminal networks can be decoupled from a voltage equalization as desired in order to carry out a voltage equalization with them at a later time if necessary and, if necessary, with other two-terminal networks connected to the device. In one embodiment, the voltage equalization process can thus be largely automated by configuring all first and second switches as diodes and temporarily disconnecting the two-terminal networks that would disturb the desired time course of the method. In this way, a minimal number of controllable switches is required. It is then sufficient in one embodiment to configure the third switches as actively controllable switches.

In one embodiment of the method, two or more power-outputting two-terminal networks with initially different voltages can be connected to the device. In this case, power output can initially be made possible for the two-terminal network whose absolute voltage, i.e., the magnitude of the voltage between its first connection and the reference potential GND, is maximum. The power outputs for the other two-terminal networks can then each be made possible with a time delay, for example, depending on a voltage between the first connection assigned thereto and the input of the current-limiting component. Such a behavior can, for example, occur if the power-outputting two-terminal networks each have an effective capacitance on the connection side and is at least partially discharged over time depending on the power output of the two-terminal networks. In a further embodiment, alternatively or cumulatively, two or more power-consuming two-terminal networks with different voltages can be connected to the device, wherein power consumption is initially made possible for the two-terminal network whose absolute voltage, i.e., the magnitude of the voltage between its first connection and the reference potential GND, is minimal. The power consumptions for the other two-terminal networks can then each be made possible with a time delay, for example, depending on a voltage between the first connection assigned thereto and the output of the current-limiting component. This behavior can, for example, occur if the power-consuming two-terminal networks each have an effective capacitance on the connection side and is at least partially charged depending on the power consumption of the two-terminal networks.

In the device and in the method, it is possible in one embodiment that the positive terminals of the two-terminal networks are each connected to a different one of the first connections and the negative terminals of the two-terminal networks are each connected to a different one of the second connections of the device. In this case, the common reference potential GND is formed by the negative terminals of the two-terminal networks. Alternatively, it is however also possible that the negative terminals of the two-terminal networks are each connected to a different one of the first connections and the positive terminals of the two-terminal networks are each connected to a different one of the second connections of the device. In this case, the common reference potential GND is formed by the positive terminals of the two-terminal networks. This is advantageous in one embodiment if the current-limiting component is configured as a special DC/DC converter, such as a buck converter. This is because, in this case, an actively controllable switch as a so-called low-side switch of the DC/DC converter can have a quiescent emitter potential or source potential, which, as also explained again in more detail in FIG. 3c, makes simpler control of the actively controllable switch possible.

A DC power distribution system according to the disclosure with two-terminal networks that can be connected in a voltage-equalizing manner includes a device according to the disclosure for the voltage equalization of at least two two-terminal networks, and the plurality n (n≥2) of the at least two two-terminal networks that are connected to the device. The DC power distribution system is configured to carry out the method. The advantages already explained in connection with the device and the method arise.

In one embodiment of the DC power distribution system, at least one of the n two-terminal networks comprises one or more of the following elements:

a DC connection of an inverter having an intermediate
        circuit capacitance and/or an input capacitance,
    an electrolyzer,
    a battery,
    a DC grid with a capacitance coupled thereto,
    a DC output of a rectifier connected to an AC grid, and
    a charging cable for an electric vehicle.

A further embodiment of the DC power distribution system can comprise a power-outputting and non-regenerative two-terminal network (e.g., meaning the two pole network is configured such that a power output thereof is enabled and a power intake therein is blocked), which is connected or switchably connected with one of its terminals directly to the input of the current-limiting component and with the other of its terminals to the reference potential GND. For this purpose, it is connected to one of the connection pairs whose first connection is connected directly to the input of the current-limiting component. On the other hand, a power-outputting but in principle regenerative two-terminal network is connected to a connection pair whose first connection is connected to the input of the current-limiting component via a first switch. In this way, it is possible, if necessary, to prevent electrical power from being fed back into the two-terminal network.

DETAILED DESCRIPTION

The disclosure relates to a device and a method for the voltage equalization of a plurality of two-terminal networks. The two-terminal networks may be two-terminal networks designed to be interconnected in a direct current circuit (DC circuit). The two-terminal networks may include one or more two-terminal networks that operate in a power-outputting manner during the voltage equalization. However, it is also possible that they have one or more two-terminal networks that operate in a power-consuming manner during the voltage equalization. The disclosure furthermore relates to a DC power distribution system with such a device.

Figure 1:
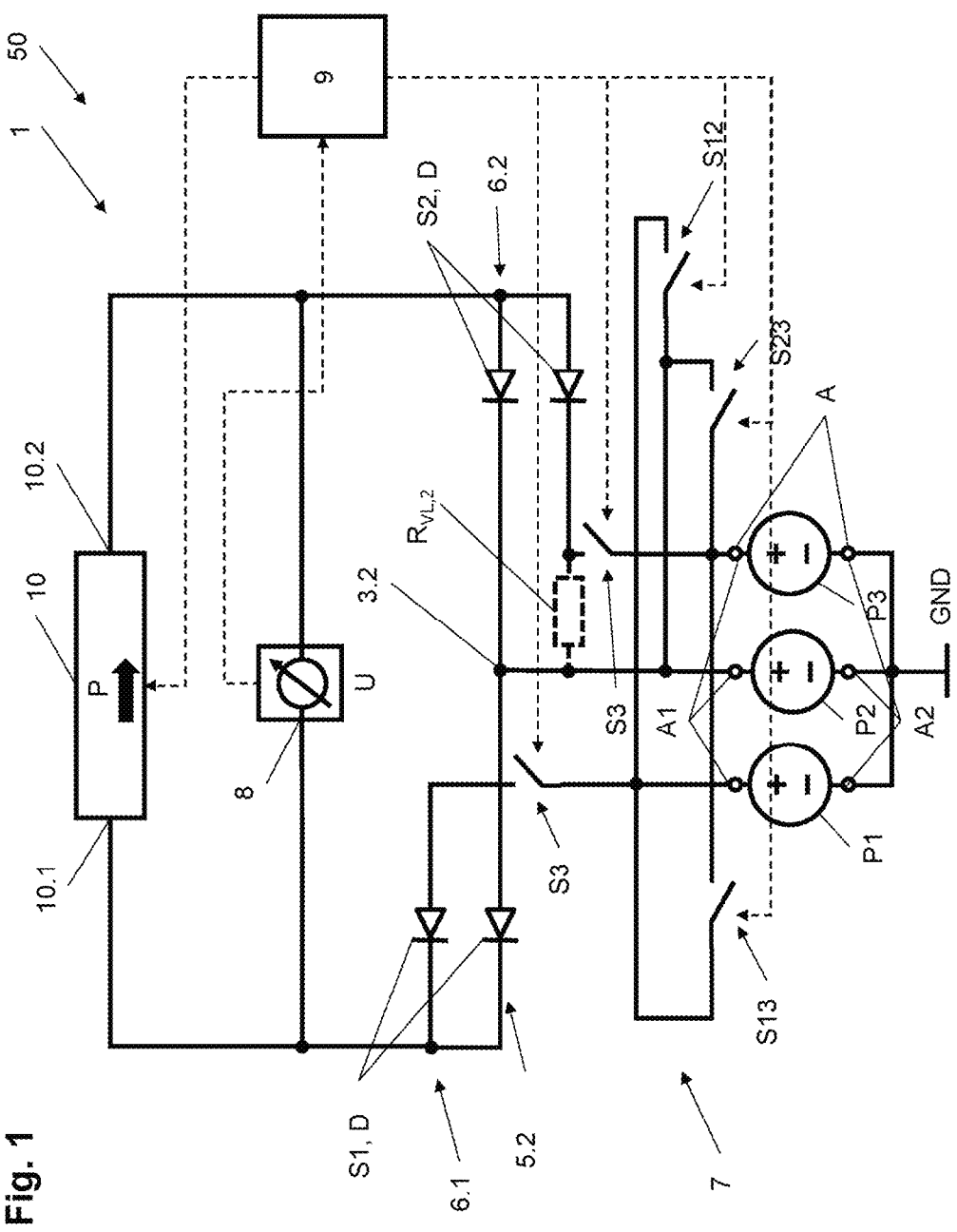
FIG. 1 shows a first embodiment of a device according to the disclosure for voltage equalization, which is connected to a plurality of n two-terminal networks.

FIG. 1 shows a first embodiment of a device 1 according to the disclosure for the voltage equalization of a plurality n of at least two (n≥2) two-terminal networks. In addition, FIG. 1 also illustrates a DC power distribution system 50, which corresponds to a combination of the device 1 and the two-terminal networks P1, P2, P3 connected to the device 1. By way of example and not by way of limitation, the device 1 in FIG. 1 is configured to operate three two-terminal networks P1, P2, P3, which are each connected to a first connection A1 and a second connection A2 of a different one of the three connection pairs A. Two of the first connections A1 (the connections of the two-terminal networks P1 and P2 in FIG. 1 by way of example) are each connected to an input 10.1 of a current-limiting component (e.g., a device, element or circuit) 10 via a first switch S1 and a common first connection point 6.1. Furthermore, the first connections A1 of two connection pairs A are each connected to an output 10.2 of the current-limiting component 10 via a second switch S2 and a common second connection point 6.2. The second connections A2 of the connection pairs A are connected with low resistance to one another and to a common reference potential GND. The connection of the second connections A2 to the reference potential GND is shown in FIG. 1 as a direct connection in each case. Alternatively, it is however also possible for the connection for one or more of the second connections A2, optionally also for all second connections A2, to be switchable, that is, switchably connected to the reference potential.

In FIG. 1, one of the two-terminal networks P1, P2, P3 (here: P2) is configured to operate in a power-outputting manner at one time and in a power-consuming manner at another time. For this purpose, the first connection A1 assigned thereto is connected both via one of the first switches S1 to the input 10.1 and via one of the second switches S2 to the output 10.2 of the current-limiting component 10. The first switch S1 and the second switch S2 are connected in series in a bridge branch 5.2, wherein a branch tap 3.2 of the bridge branch 5.2 is connected to the first connection A1 assigned to the two-terminal network P2.

The device 1 has a voltage sensor 8, which is connected to a control unit (e.g., a microcontroller, device, or circuit) 9 of the device 1. The voltage sensor 8 is configured to detect a voltage U applied to the current-limiting component 10. As also explicitly shown in FIG. 1, for controlling the current-limiting component 10, the control unit 9 can be connected thereto by control technology. This may, for example, be the case if the current-limiting component 10 includes actively controllable component parts, for example, an actively controllable semiconductor switch. Alternatively, a semiconductor switch of the current-limiting component may also be controlled autonomously and without a connection to a voltage sensor 8. This is the case, for example, with a current control, for example, a control of the output current of the current-limiting component 10. In general, control connections are symbolized by a dashed line in FIG. 1, and in FIGS. 2*a* and 2*b*. The device 1 further includes a switching unit (e.g., array, matrix, device or circuit) 7, which comprises a plurality of switches S12, S13, S23 for the low-resistance connection of individual first connections A1 to one another. The control unit 9 is configured to control the switching unit 7, for example, its switches S12, S13, S23, depending on the voltages prevailing in each case between the first connections A1 and/or the voltage U dropping across the current-limiting component 10. The first connections A1 of individual two-terminal networks (P1 and P3 in FIG. 1 by way of example) are additionally each connected via an actively controllable third switch S3 to the first switches S1 or second switches S2 assigned thereto. Via the third switch S3, the corresponding two-terminal network P1, P3 can, if necessary, be decoupled with regard to its output or consumption of a power flow during the voltage equalization, which is equivalent to a temporary activation or deactivation of the corresponding two-terminal network P1, P3 during the voltage equalization. The third switch S3 connected to the first connection A1 of the first two-terminal network P1 is connected to the first connection point 6.1 via a diode D so that the combination of the third switch S3 and diode D has the same effect as a first switch S1 configured as a unidirectional switch.

As shown in FIG. 1, the first connections A1 of two two-terminal networks (here: the two-terminal networks P2 and P3) can optionally also be connected, for example, switchably connected, via an additional impedance in the form of a further pre-charging resistor $R_{VL,2}$. This is, in one embodiment, advantageous if a current flow required for the voltage equalization of the relevant two-terminal networks P2, P3 exceeds a current carrying capacity of the current-limiting component 10. Since the further pre-charging resistor $R_{VL,2}$ is an optional component, it is shown in dashed lines in FIG. 1.

In the following, a possible embodiment of an operating method is explained using the example of the device 1. For this purpose, it is assumed, by way of example, that the two-terminal network P1 represents a DC connection of a low-power power supply, i.e., in the simplest case of a rectifier, the two-terminal network P2 represents a DC side of a bidirectional high-power AC/DC converter, and the two-terminal network P3 represents a DC input of an electrolyzer. In one embodiment, in the initial state, all third switches S3 and all switches S12, S13, S23 of the switching unit 7 are open. One DC side of the bidirectional AC/DC converter (i.e., the two-terminal network P2) is voltage-free since the AC/DC converter is not yet connected on its AC side to an AC grid (not shown in FIG. 1). The two-terminal network P3, which represents the electrolyzer, is also voltage-free. As part of a multi-stage voltage equalization, the DC side of the bidirectional AC/DC converter (i.e., the two-terminal network P2) is now to be charged first by the two-terminal network P1, and the DC input of the electrolyzer (i.e., the two-terminal network P3) is then to be charged by the two-terminal network P2 for its normal operation:

For this purpose, the third switch S3 assigned to the first two-terminal network P1 is initially closed. Due to the voltages U(P1), U(P2) of the first two-terminal network P1 and of the second two-terminal network P2, the first switch S1 assigned to the first two-terminal network P1 and the second switch S2 assigned to the second two-terminal network P2 are put into a conductive switching state. This results in a power flow P via the current-limiting component 10 from the first connection A1 of the first two-terminal network P1 to the first connection A1 of the second two-terminal network P2, whereby said second two-terminal network P2 is charged and whereby the voltage U(P2) thereof is adjusted to equal the voltage U(P1) of the first two-terminal network P1. The high-power bidirectional AC/DC converter is then synchronized and connected to the AC grid. This completes the first stage of the multi-stage voltage equalization of the three two-terminal networks P1, P2, P3. For the following second stage of the voltage equalization, the third switch S3 assigned to the electrolyzer (two-terminal network P3) is closed. The voltages of the first P1 and of the second two-terminal network P2 are almost equal and greater than the voltage U(P3) of the third two-terminal network P3, i.e., U(P1)≈U(P2)>U(P3) now applies. Due to the voltage conditions, the first switches S1 of the first two-terminal network P1 and of the second two-terminal network P2 as well as the second switch S2 of the third two-terminal network P3 are now put into or kept in the conductive switching state. This results in a power flow P via the current-limiting component 10 from the now power-outputting two-terminal networks P1, P2 to the now power-consuming two-terminal network P3, whereby the DC input of the electrolyzer is charged and the voltage U(P3) thereof approaches the voltages U(P1), U(P2) of the two-terminal networks P1, P2. In addition, a power flow via the optional pre-charging resistor $R_{VL,2}$ can support the voltage equalization. If an absolute value of the difference between the two voltages of the two-terminal networks P2, P3 reaches or falls below a voltage threshold value $U_{TH}$, i.e., |U(P3)−U(P2)|<$U_{TH}$, the first connections A1 thereof can be connected with low resistance to one another by the switching unit 7, more precisely the switch S23 thereof. This completes the second stage of the voltage equalization and thus also the multi-stage voltage equalization as such.

Both the first switches S1 and the second switches S2 are by way of example formed in FIG. 1 as diodes D whose switching states are each set depending on the voltages applied to the corresponding first connections A1 and the second connections A2, i.e., specifically depending on the voltages applied to the two-terminal networks P1, P2, P3. Alternatively, in another embodiment it is possible for one or more of the first switches S1 to be formed as actively controllable switches.

Figure 2A:
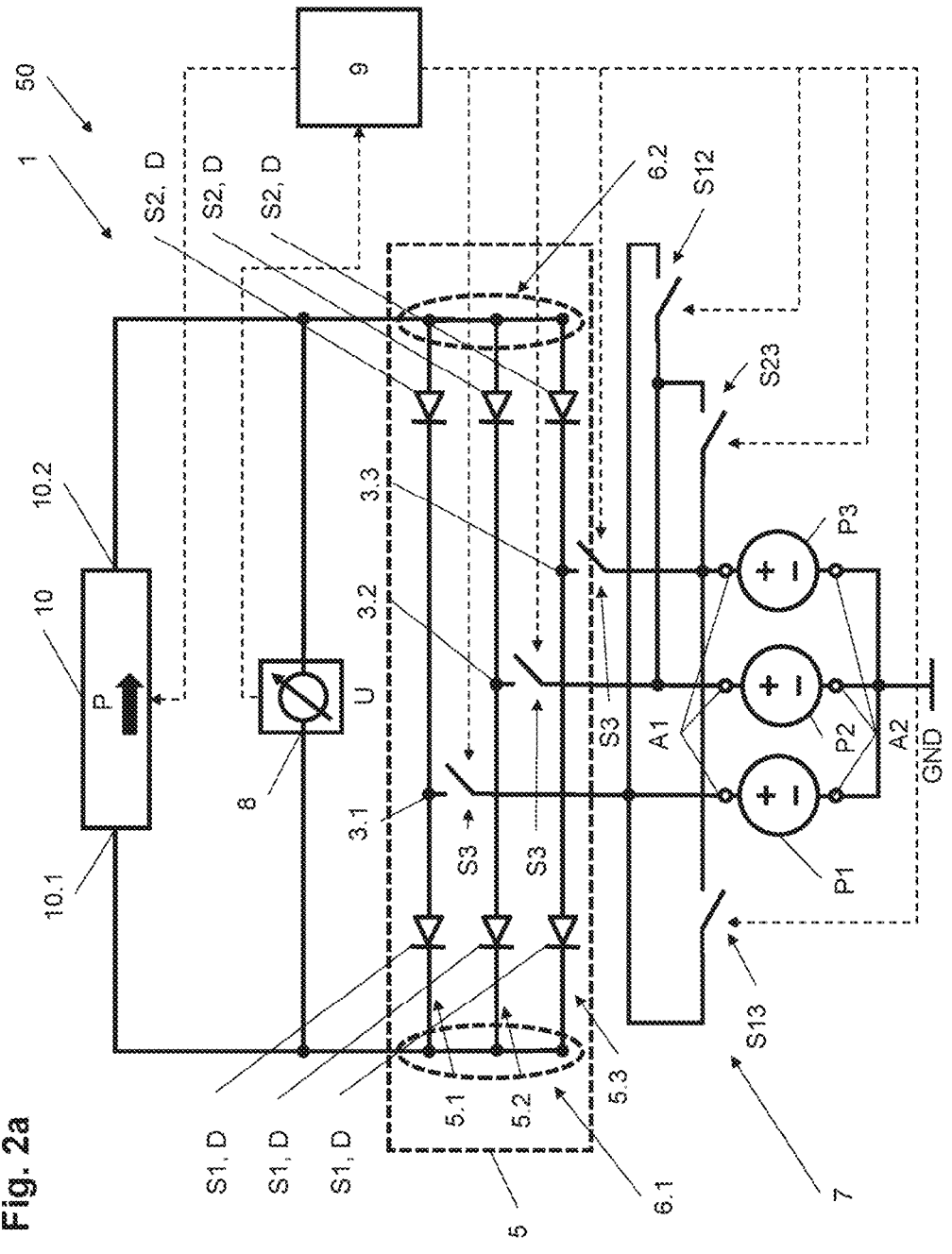
FIG. 2*a* shows a second embodiment of a device according to the disclosure for voltage equalization.

FIG. 2a shows a second embodiment of a device 1 according to the disclosure, which in many respects is similar to the first embodiment already explained in FIG. 1. Only the differences from the embodiment in FIG. 1 are therefore described below. For the matching features, reference is made to the figure description in FIG. 1.

In contrast to the first embodiment shown in FIG. 1, all two-terminal networks P1, P2, P3 in the embodiment of FIG. 2a are designed for both a power-consuming and a power-outputting operation. This may, for example, be the case if each of the two-terminal networks P1, P2, P3 is not only to be charged (i.e., its voltage U(P1), U(P2), U(P3) increased) but also to be discharged (i.e., its voltage U(P1), U(P2), U(P3) reduced) via the current-limiting component 10 by means of the device 1. Each of the two-terminal networks P1, P2, P3 is therefore connected via a branch tap 3.1, 3.2, 3.3 of a relevant bridge branch 5.1, 5.2, 5.3 assigned thereto, and is thus connected both via a first switch S1 to the input 10.1 and via a second switch S2 to the output 10.2 of the current-limiting component 10. The bridge branches 5.1, 5.2, 5.3 are each arranged in parallel with the current-limiting component 10 and together form a bridge 5 with a first connection point 6.1, via which the first switches S1 are connected to the input 10.1, and a second connection point 6.2, via which the second switches S2 are connected to the output 10.2 of the current-limiting component 10.

Figure 2B:
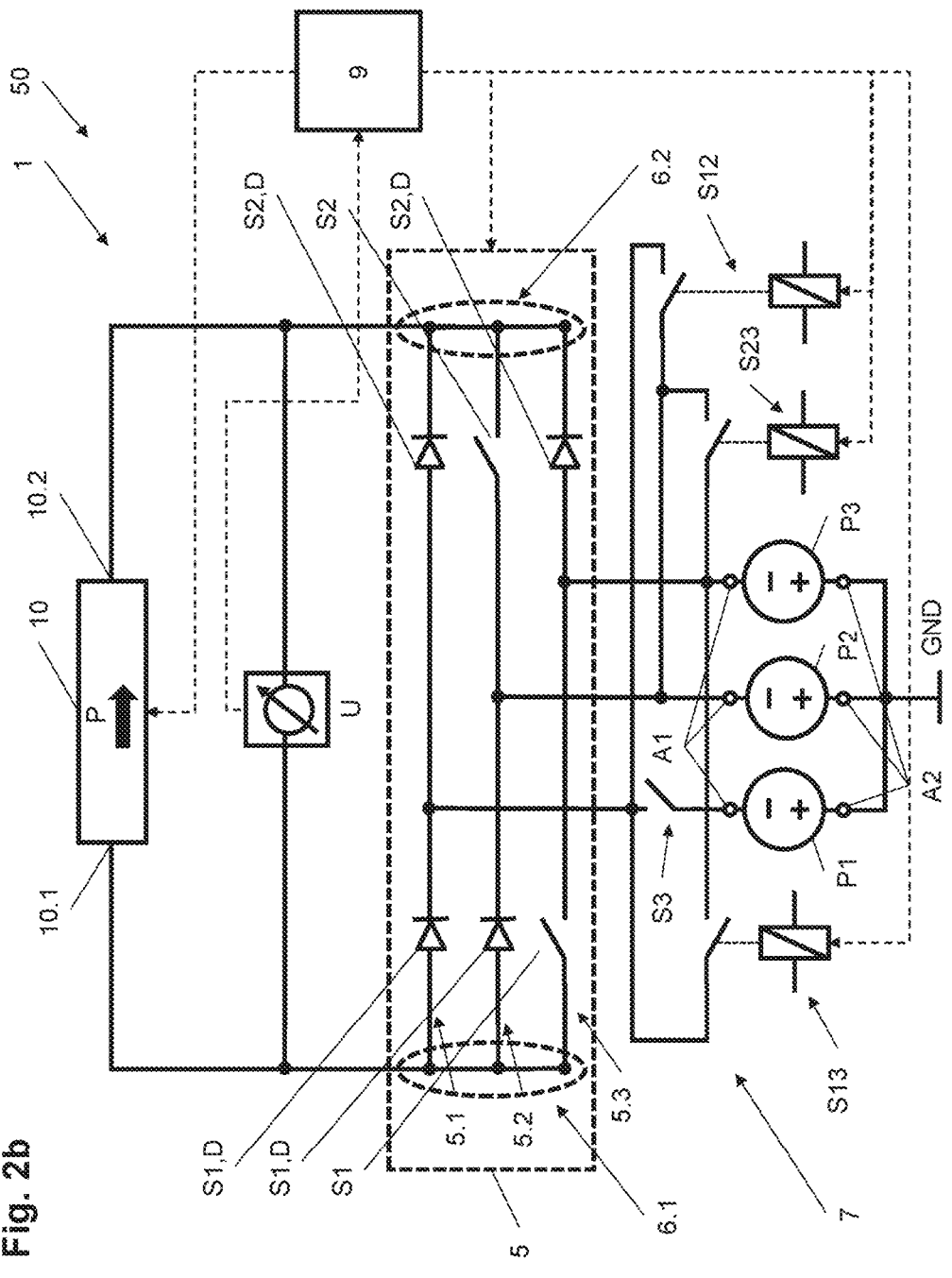
FIG. 2*b* shows a third embodiment of a device according to the disclosure for voltage equalization.

FIG. 2b shows a third embodiment of the device 1 according to the disclosure. This device is also similar in many respects to the first embodiment already explained in FIG. 1, which is why only the differences from the embodiment explained in FIG. 1 are discussed below.

In FIGS. 1 and 2a, the positive (+) terminals of the two-terminal networks P1, P2, P3 are each connected to one of the first connections A1, and the negative (−) terminals of the two-terminal networks P1, P2, P3 are each connected to one of the second connections A2 of the device 1. In contrast, in the embodiment according to FIG. 2b, the positive (+) terminals of the two-terminal networks P1, P2, P3 are each connected to one of the second connections A2, and the negative (−) terminals of the two-terminal networks P1, P2, P3 are each connected to one of the first connections A1 of the device 1. The reference potential GND is formed here by the positive terminals of the two-terminal networks P1, P2, P3. By way of example, in the bridge branches 5.1-5.3, only some of the first switches S1 (here: those of the bridge branches 5.1 and 5.2) and of the second switches S2 are formed as a diode D (here: those of the bridge branches 5.1 and 5.3), while the others are formed as actively controllable switches. The flow direction of the first and second switches designed as diodes D is opposite to the embodiment shown in FIG. 2a, so that the same forward conducting and reverse blocking behavior results with regard to the power flows. As also described in more detail in connection with FIG. 3c, this type of connection of the two-terminal networks P1, P2, P3 with the connection pairs A results in a simple implementation of the current-limiting component 10. In one embodiment, a current-limiting component 10 configured as a special DC/DC converter, namely, a DC/DC converter with a low-side switch, can be controlled and operated more simply.

Figure 3A:
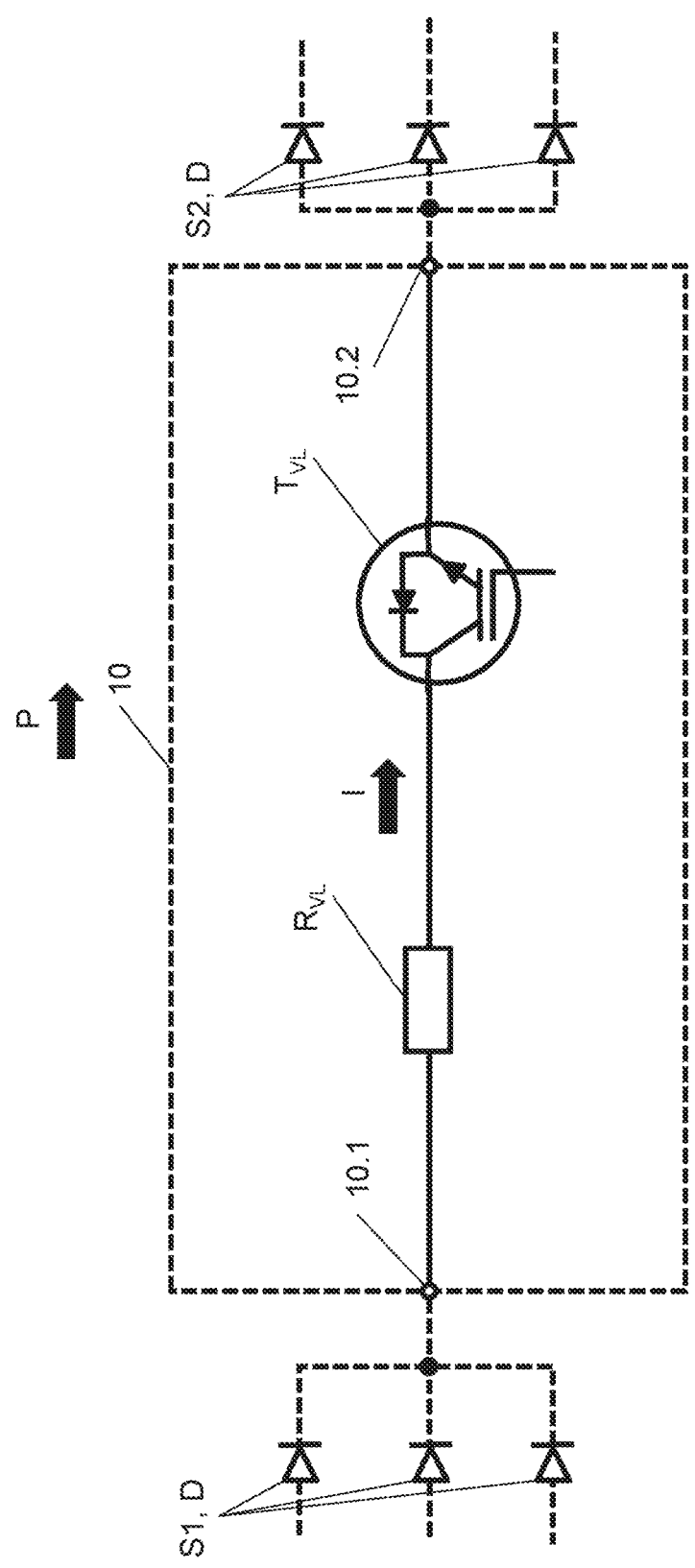
FIG. 3*a* shows a first embodiment of a current-limiting component of the device.

FIG. 3a shows a first embodiment of a current-limiting component 10 as can be used in the device 1. The direction of the current flow I and of the power flow P are schematically symbolized by arrows in FIG. 3a (and in the following FIGS. 3b, 3c). For better understanding, the first switches S1 and second switches S2 of the device 1 (cf., for example, FIG. 2a) formed as diodes D are also shown again in order to clarify their type of connection to the input 10.1 and the output 10.2.

For the following explanation of FIG. 3a (and FIG. 3b), it is assumed that the positive (+) terminals of the two-terminal networks P1, P2, P3 are each connected to one of the first connections A1, while their negative (−) terminals are each connected to one of the second connections A2, and thus to the reference potential GND. In order to generate a unidirectional power flow P from the input 10.1 to the output 10.2 in this case, the diodes D of the first switches S1 are each connected with their cathode to the input 10.1 and the diodes D of the second switches S2 are each connected with their anode to the output 10.2. The current flow I and the power flow P flow through the current-limiting component 10 in the same direction. In the first embodiment, the current-limiting component 10 may include only one component part. The component part may be configured as an ohmic resistor $R_{VL}$. The ohmic resistor $R_{VL}$ may be a thermistor, for example, a negative temperature coefficient NTC thermistor. Alternatively or cumulatively (i.e., in series with the ohmic resistor $R_{VL}$), the current-limiting component 10 may also include a transistor $T_{VL}$ that can be controlled by the control unit 9. The transistor $T_{VL}$ can be controlled such that it operates in its linear range during the power flow P. Advantageously, however, it can be controlled in a clocked manner.

Figure 3B:
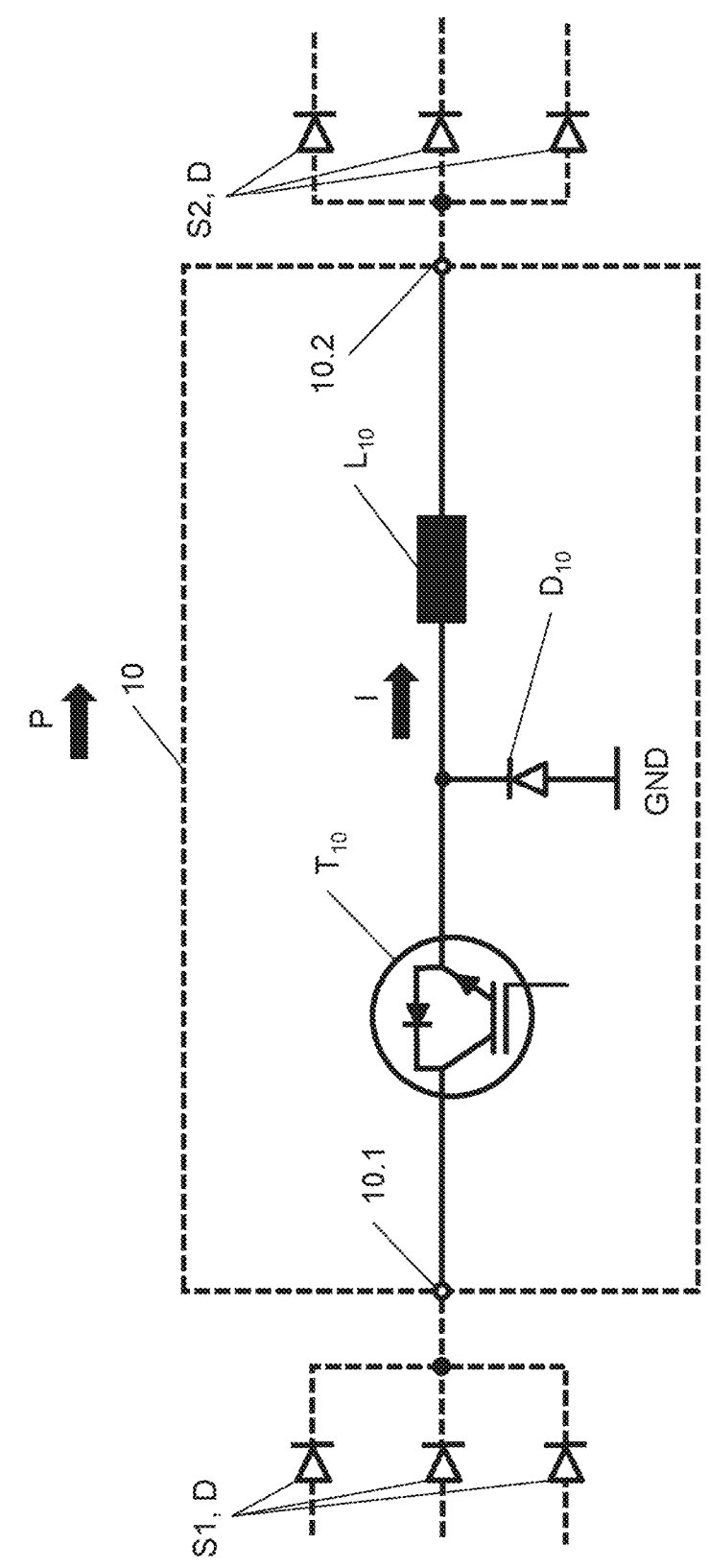
FIG. 3*b* shows a second embodiment of a current-limiting component of the device.

FIG. 3b shows a second embodiment of the current-limiting component 10, which is configured as a DC/DC converter. In one embodiment, this is a DC/DC converter that steps down from the input 10.1 to the output 10.2. The second embodiment can be used in a case where the positive (+) terminals of the two-terminal networks P1, P2, P3 are each connected to one of the first connections A1, while the negative (−) terminals are each connected to one of the second connections A2, and thus to the reference potential GND. The DC/DC converter includes a series circuit of a transistor $T_{10}$ and an inductance $L_{10}$, whose connection point is connected via a diode $D_{10}$ to the reference potential GND of the device 1. Although only one specific topology of a step-down DC/DC converter is shown here by way of example, it is alternatively also possible to use other known topologies of step-down DC/DC converters. However, due to the only unidirectional power flow specified by the first switches S1 and the second switches S2, the DC/DC converter can be implemented in a simple design and therefore cost-effectively. Specifically, it is also sufficient to design the current-limiting component 10 as a DC/DC converter that only steps down in one direction, and not as a DC/DC converter that steps down in both directions. Due to the design of the current-limiting component as a buck converter, a current flowing through the input 10.1 and a current flowing through the output 10.2 may have different current intensities (not shown in FIG. 3b). However, both currents can be limited by a suitable control of the buck converter in a way that makes sense for the function of the current-limiting component.

Figure 3C:
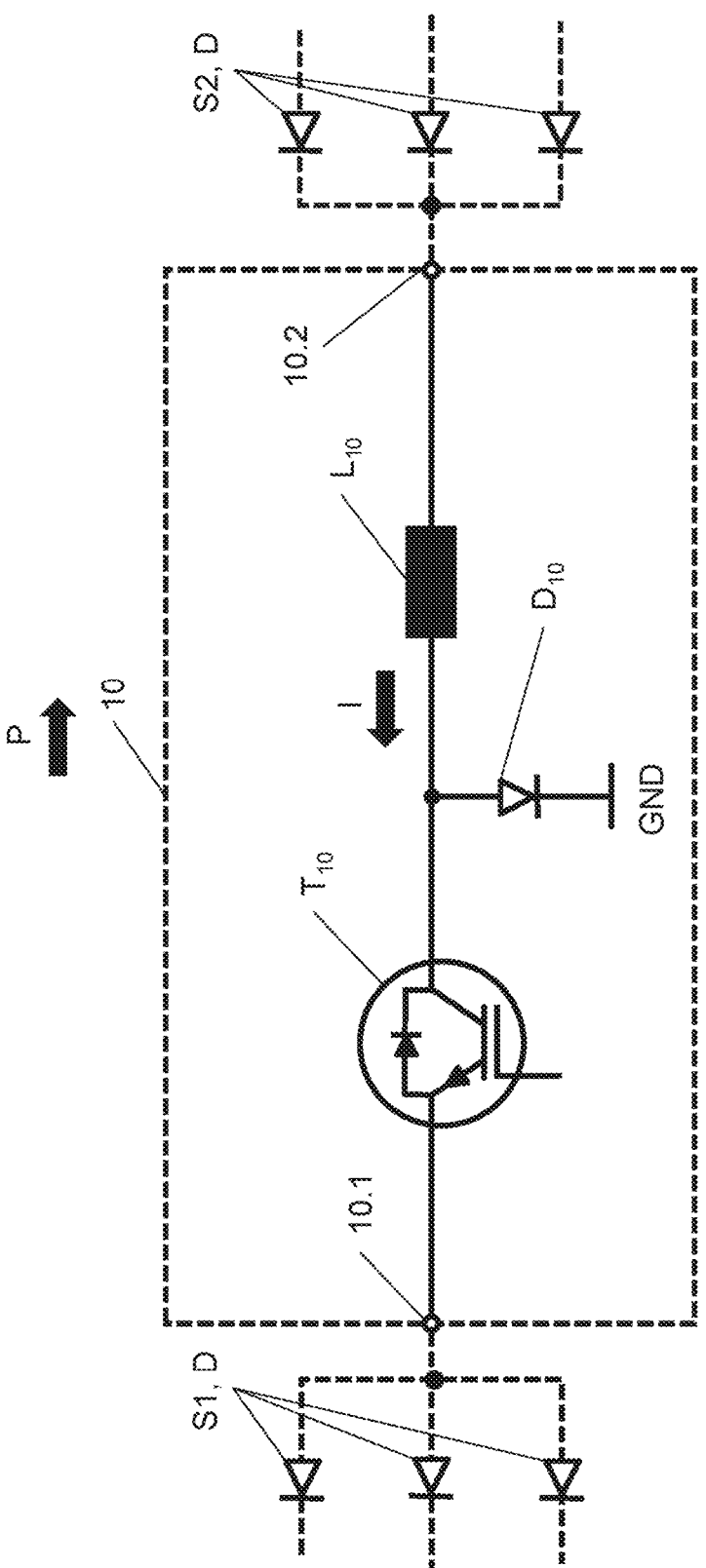
FIG. 3*c* shows a third embodiment of a current-limiting component of the device.

FIG. 3c shows a third embodiment of the current-limiting component 10, which is also configured as a DC/DC converter that steps down from the input 10.1 to the output 10.2. The third embodiment can be used in a case where the negative (−) terminals of the two-terminal networks P1, P2, P3 are each connected to one of the first connections A1, while the positive (+) terminals of the two-terminal networks P1, P2, P3 are each connected to one of the second connections A2, and thus to the reference potential GND. In order to generate a power flow from the input 10.1 to the output 10.2 in this case, the diodes D of the first switches S1 are each connected with their anode to the input 10.1. Accordingly, the diodes D of the second switches S2 are each connected with their cathode to the output 10.2. In this case, the current flow I is opposite to the power flow P. Both potentials, i.e., that of the input 10.1 and that of the output 10.2, are smaller (i.e., more negative) or equal to the reference potential GND, which is formed by the positive (+) terminals of the two-terminal networks P1, P2, P3. However, the output 10.2 is at a more positive potential relative to the input 10.1, which generates the current flow I from the output 10.2 to the input 10.1, although the power flow P is still directed from the input 10.1 to the output 10.2.

Similarly to the embodiment of FIG. 3b, the DC/DC converter of FIG. 3c also includes a series circuit of a transistor $T_{10}$ and an inductance $L_{10}$, whose connection point is connected via a diode $D_{10}$ to the reference potential GND. In operation, the transistor $T_{10}$ is a so-called low-side switch, whose emitter connection or source connection has a quiescent potential. For controlling the transistor $T_{10}$, a gate-source voltage is required. The required gate-source voltage can be generated much more easily relative to a quiescent emitter potential or source potential than relative to an emitter potential or source potential that depends on the switching state of the transistor $T_{10}$ and would therefore jump with the switching process of the transistor $T_{10}$, as would be the case with a high-side switch, for example. A driver for providing the required gate-source voltage can therefore be implemented more simply and cost-effectively for the low-side switch shown in FIG. 3c.

Figure 4A:
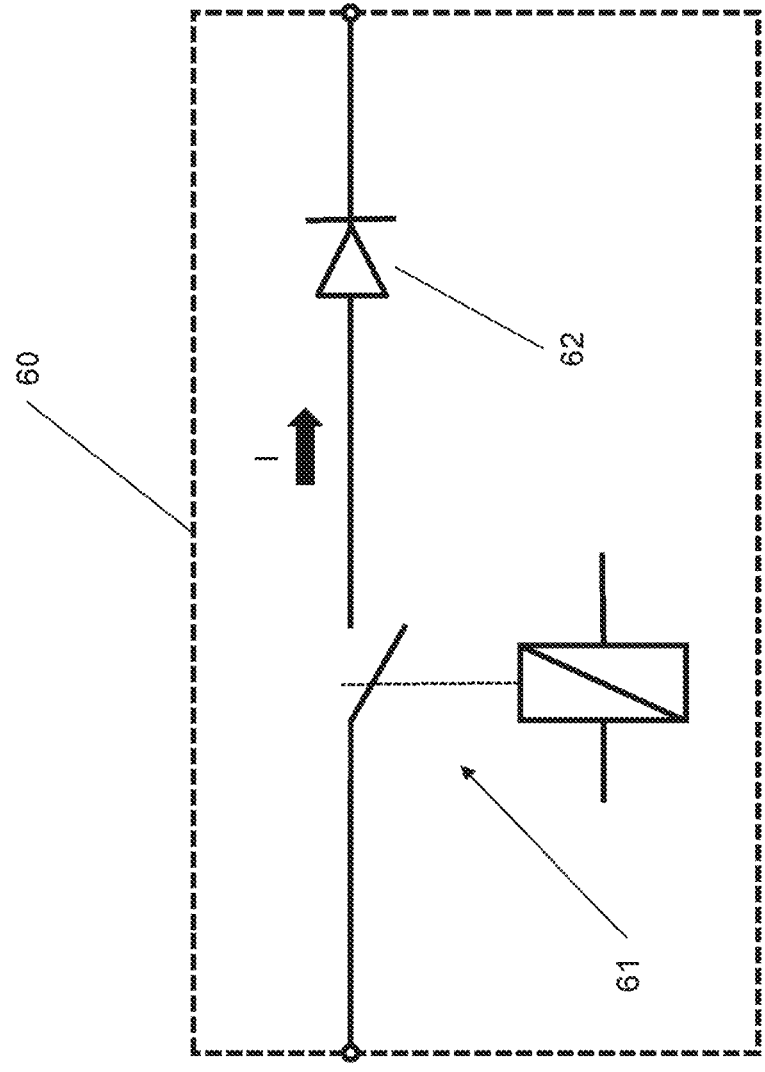
FIG. 4*a* shows a first embodiment of a unidirectional switch.

FIG. 4a shows a first embodiment of a unidirectional switch 60, as it can be used as a first switch S1 and/or as a second switch S2 within the device 1 in FIGS. 1, 2a and 2b. The unidirectional switch 60 has a series circuit of a diode 62 and a switch that is bidirectionally conductive in its closed state, i.e., is configured for a bidirectional power flow. FIG. 4a shows the switch, which is bidirectionally conductive in the closed state, by way of example as an electromechanical switch 61. As an alternative to the electromechanical switch 62, another switch that is bidirectionally conductive in the closed state, for example a MOSFET, is also possible. The relevant control state, in which the unidirectional switch 60 in FIG. 4a behaves like a diode, corresponds to the closed state of the electromechanical switch 61 (or alternatively of the MOSFET). A further control state of the unidirectional switch 60 results when the electromechanical switch 61 is open. In this case, the power flow is suppressed in both directions. This may, for example, be used to temporarily suppress a power flow that is in principle intended but not permanently desired.

Figure 4B:
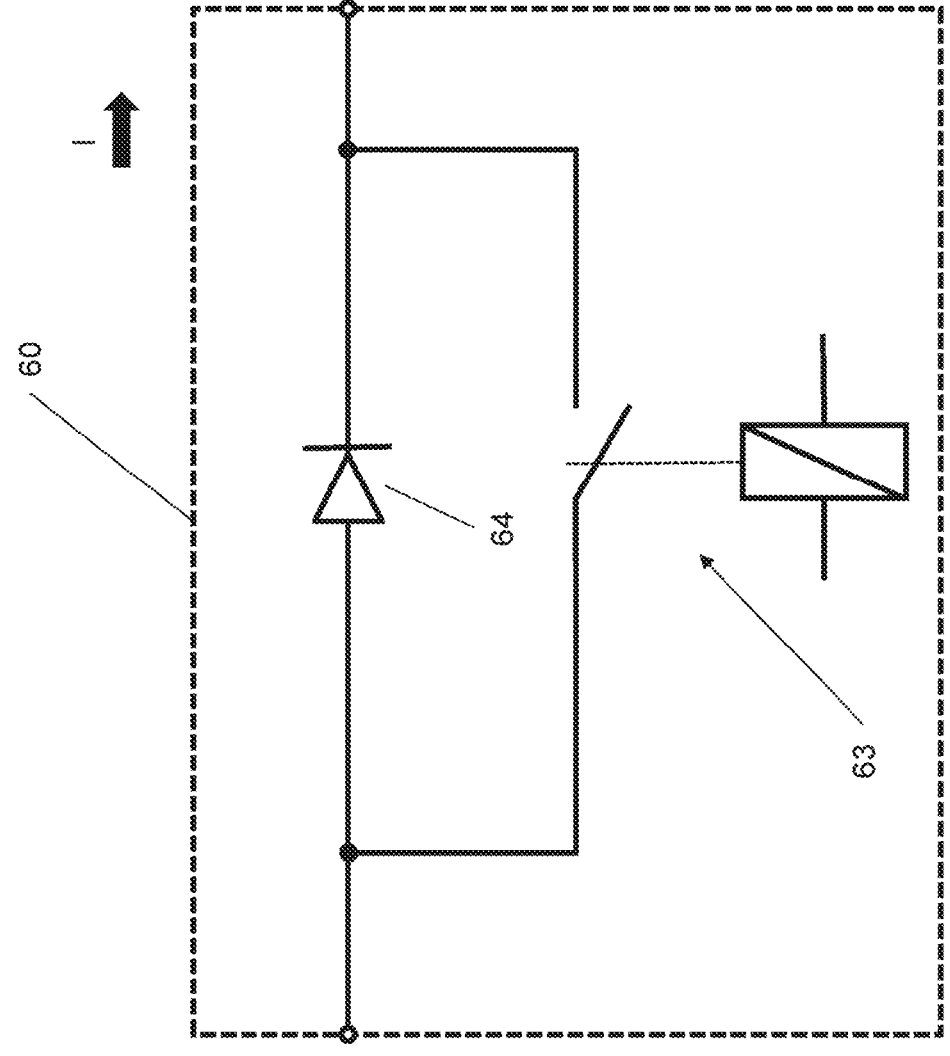
FIG. 4*b* shows a second embodiment of a unidirectional switch.

FIG. 4b shows a second embodiment of a unidirectional switch 60, which corresponds to a parallel circuit of a diode 64 and a switch that is bidirectionally conductive in the closed state, which switch is shown here by way of example as an electromechanical switch 63. The control state of the unidirectional switch 60 in which the unidirectional switch 60 in FIG. 4b behaves like a diode, i.e., allows power to flow in one direction and blocks it in the other direction, corresponds to the open state of the electromechanical switch 63 in FIG. 4b. A further control state of the unidirectional switch 60 according to FIG. 4b results when the electromechanical switch 63 is closed. The further control state can be used to reduce a forward voltage of the unidirectional switch and thus a power loss of the diode 64 that is caused by the power flow. It can also be used to temporarily allow power to flow bidirectionally via the unidirectional switch 60. Here too, instead of the electromechanical switch 63 shown by way of example, it is also possible to use a semiconductor switch that is bidirectionally conductive in the closed state. If a MOSFET is used for this purpose, it generally already includes a body diode so that a separate diode 64 can be omitted. In other words, the unidirectional switch 60 according to FIG. 4*b* may be designed in one embodiment as a MOSFET.

Figure 4C:
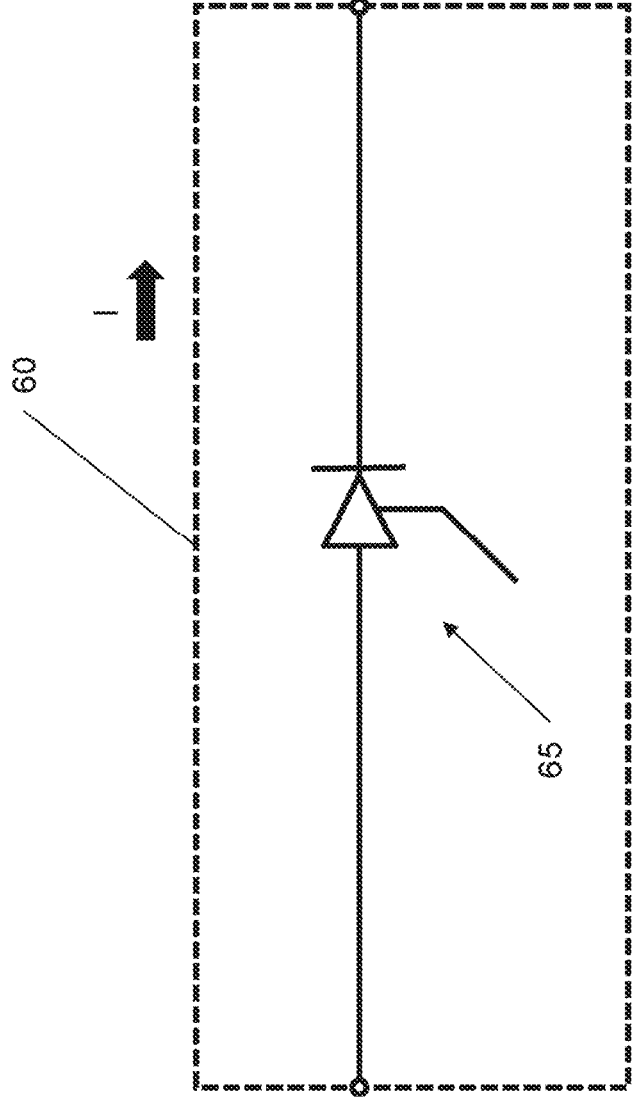
FIG. 4*c* shows a third embodiment of a unidirectional switch.

FIG. 4*c* shows a third embodiment of a unidirectional switch 60, in which the unidirectional switch 60 is configured as a thyristor 65. The control state in which the unidirectional switch 60 in FIG. 4*c* behaves like a diode, i.e., allows power to flow in one direction and blocks it in the other direction, occurs after the firing pulse has been applied to the thyristor. The control state is terminated by current extinguishing, i.e., decaying of the current I flowing through the unidirectional switch 60. After the current has been extinguished and in the absence of a firing pulse, the unidirectional switch 60 formed by the thyristor 65 assumes a further control state, which is characterized by a bidirectional suppression of a power flow. This can be used for a temporary suppression of a power flow that is in principle intended but not permanently desired.

What is claimed is:

1. A device for voltage equalization of a plurality of at least two two-terminal networks, comprising:
   a current-limiting circuit comprising an input and an output,
   at least two connection pairs, each connection pair having a first connection and a second connection configured to connect the at least two two-terminal networks to other elements of the device,
   wherein two or more of the first connections are each connected via a first switch or directly to the input of the current-limiting circuit and two or more of the first connections are furthermore each connected via a second switch to the output of the current-limiting circuit, and
   wherein the second connections of the at least two connection pairs are connected or switchably connected to a common reference potential,
   wherein the device is configured to set switching states of the first switches and of the second switches via a control circuit and/or via voltages applied to the first connections in such a way that:
   the current-limiting circuit receives power from one or more of the first connections via one or more of the first switches or the direct connection, but not via one or more of the second switches, and
   the current-limiting circuit outputs power to one or more of the first connections via one or more of the second switches, but not via one or more of the first switches,
   so that a unidirectional power flow via the current-limiting circuit from the input to the output is effectuated and a reverse power flow from the output to the input is suppressed.

2. The device according to claim 1, wherein the device is configured for a voltage equalization of three or more two-terminal networks and, for this purpose, has three or more connection pairs.

3. The device according to claim 2, wherein, at least temporarily, at least three of the first connections are simultaneously involved in a power flow via the current-limiting circuit.

4. The device according to claim 1, wherein one or more of the first connections are each connected both via a first switch switchably to the input and via a second switch switchably to the output of the current-limiting circuit, whereby one or more bridge branches having branch taps are formed, which are assigned to respective first connections and each have a series circuit of a respective first switch and a respective second switch, and whose branch taps are connected to the first connections assigned thereto.

5. The device according to claim 1, wherein at least one of the first switches and/or at least one of the second switches comprises a unidirectional switch.

6. The device according to claim 1, wherein at least one of the first switches and/or at least one of the second switches comprises a diode or is formed as a diode.

7. The device according to claim 1, wherein at least one of the first switches or one of the second switches comprises a semiconductor switch or an electromechanical switch that is controlled by the control circuit.

8. The device according to claim 1, wherein the current-limiting circuit comprises an ohmic resistor, a thermistor, or an actively controllable semiconductor switch, or wherein the current-limiting circuit comprises a series circuit of two different ones of the ohmic resistor, the thermistor, or the actively controllable semiconductor switch.

9. The device according to claim 1, wherein the current-limiting circuit comprises a DC/DC converter that steps down from the input to the output.

10. The device according to claim 1, further comprising a switching circuit configured to switchably connect two or more of the first connections with low resistance to one another, in response to the control circuit, wherein the control circuit is configured to connect two or more of the first connections with low resistance to one another depending on a voltage prevailing between the respective first connections.

11. The device according to claim 10, wherein the switching circuit provides a switchable low-resistance connection of two or more of the first connections of the at least two two-terminal networks to one another via two or more of the first switches controlled by the control circuit, or via two or more of the second switches controlled by the control circuit.

12. The device according to claim 10, further comprising a voltage sensor configured to detect a voltage applied to the current-limiting circuit, wherein the control circuit is configured to operate the switching circuit depending on the voltage applied to the current-limiting circuit.

13. The device according to claim 1, further comprising one or more third switches controlled by the control circuit, wherein each of the third switches is arranged between a different one of the first connections and a respective first switch assigned thereto, and/or between a different one of the first connections and a respective second switch assigned thereto.

14. A method for the voltage equalization of a plurality of at least two two-terminal networks with a device comprising:
   a current-limiting circuit comprising an input and an output,
   at least two connection pairs, each connection pair having a first connection and a second connection configured to connect the at least two two-terminal networks to other elements of the device,
   wherein two or more of the first connections are each connected via a first switch or directly to the input of the current-limiting circuit and two or more of the first connections are furthermore each connected via a second switch to the output of the current-limiting circuit, and wherein the second connections of the at least two connection pairs are connected or switchably connected to a common reference potential, wherein the device is configured to set switching states of the first switches and of the second switches via a control circuit and/or via voltages applied to the first connections, the method comprising:

connecting each of the two-terminal networks to a respective one of the connection pairs of the device, provided that they are not already connected, so that two or more of the two-terminal networks are each connected to the input of the current-limiting circuit in a single-terminal manner directly or switchably via a respective one of the first switches, and two or more of the two-terminal networks are each connected to the output of the current-limiting circuit in a single-terminal manner switchably via a respective one of the second switches, bringing about the voltage equalization by setting switching states of the first switches and of the second switches via the control circuit and/or via voltages applied to the first connections in such a way that the current-limiting circuit receives power from one or more of the first connections via one or more of the first switches or the direct connection, but not via one or more of the second switches, and the current-limiting circuit outputs power to one or more of the first connections via one or more of the second switches, but not via one or more of the first switches, so that a unidirectional power flow via the current-limiting circuit from the input to the output is made possible and a reverse power flow from the output to the input is suppressed.

15. The method according to claim 14, wherein two first connections, more than two first connections or all first connections of the two-terminal networks are connected with low resistance to one another via a switching circuit when an absolute value of a voltage applied between the respective first connections reaches or falls below a voltage threshold value.

16. The method according to claim 14, wherein two or more power-outputting two-terminal networks with different voltages are connected to the device, wherein power output is facilitated for one of the two-terminal networks whose absolute voltage is maximum, and wherein power outputs for other two-terminal networks are facilitated with a time delay depending on a voltage between a respective first connection assigned thereto and the input of the current-limiting circuit.

17. The method according to claim 14, wherein two or more power-consuming two-terminal networks with different voltages are connected to the device, wherein power consumption is facilitated for one two-terminal network whose absolute voltage is minimal, and wherein power consumptions for the other two-terminal networks are facilitated with a time delay depending on a voltage between a respective first connection assigned thereto and the output of the current-limiting circuit.

18. The method according to claim 14, further comprising connecting positive terminals of the two-terminal networks to the first connections, and connecting negative terminals of the two-terminal networks to the second connections of the device.

19. The method according to claim 14, further comprising connecting negative terminals of the two-terminal networks to the first connections, and connecting positive terminals of the two-terminal networks to the second connections of the device.

20. A DC power distribution system with voltage-equalizing, connectable two-terminal networks, comprising a device, comprising:

a current-limiting circuit comprising an input and an output, at least two connection pairs, each connection pair having a first connection and a second connection configured to connect at least two two-terminal networks to other elements of the device, wherein two or more of the first connections are each connected via a first switch or directly to the input of the current-limiting circuit and two or more of the first connections are furthermore each connected via a second switch to the output of the current-limiting circuit, and wherein the second connections of the at least two connection pairs are connected or switchably connected to a common reference potential, wherein the device is configured to set switching states of the first switches and of the second switches via a control circuit and/or via voltages applied to the first connections in such a way that:

the current-limiting circuit receives power from one or more of the first connections via one or more of the first switches or the direct connection, but not via one or more of the second switches, and the current-limiting circuit outputs power to one or more of the first connections via one or more of the second switches, but not via one or more of the first switches, so that a unidirectional power flow via the current-limiting circuit from the input to the output is effectuated and a reverse power flow from the output to the input is suppressed.

21. The DC power distribution system according to claim 20, wherein at least one of the two-terminal networks comprises one or more of the following:

a DC connection of an inverter having an intermediate circuit capacitance and/or an input capacitance, an electrolyzer, a battery, a DC grid with a capacitance coupled thereto, a DC output of a rectifier connected to an AC grid, and a charging cable for an electric vehicle.

22. The DC power distribution system according to claim 20, further comprising a power-outputting and non-regenerative two-terminal network, which is directly connected or switchably connected with one of its terminals to the input of the current-limiting circuit and with another of its terminals to the common reference potential.

* * * * *